(12) United States Patent
Beattie

(10) Patent No.: US 6,421,383 B2
(45) Date of Patent: Jul. 16, 2002

(54) ENCODING DIGITAL SIGNALS

(75) Inventor: Robert Beattie, Portswood (GB)

(73) Assignee: Tandberg Television ASA, N-Lysaker (NO)

( * ) Notice: Subject to any disclaimer, the term of this patent is extended or adjusted under 35 U.S.C. 154(b) by 0 days.

(21) Appl. No.: 09/088,831

(22) Filed: Jun. 2, 1998

(30) Foreign Application Priority Data

Jun. 18, 1997 (GB) .............................................. 9712651

(51) Int. Cl.[7] .............................................. H04N 7/36
(52) U.S. Cl. .......................... 375/240.05; 375/240.12; 348/699
(58) Field of Search ....................... 375/240.12, 240.05, 375/240.07; 348/699

(56) References Cited

U.S. PATENT DOCUMENTS 5,398,068 A * 3/1995 Liu et al. ..................... 348/699
6,160,846 A * 12/2000 Chiang et al. .......... 375/240.05

FOREIGN PATENT DOCUMENTS

WO    PCT/SE92/00219    10/1992    ............ H04N/5/14

OTHER PUBLICATIONS

Sohail Zafar et al: "Predictive Block–Matching Motion Estimation Schemes For Video Compression. Part I Inter–Block Prediction", Williamsburg, Apr. 7–10, 1991, New York, IEEE, US, vol.—1991, pp. 1088–1092, XP000287098 ISBN: 0–7803–0033–5, PARA. 0003, Fig. 2.
"Advanced Motion Estimation For Moving Picture Experts Group Encoders", IBM Technical Disclosure Bulletin, US, IBM Corp. New York, vol. 39, No. 4, Apr. 1, 1996, pp. 323–324, XP000587515 ISSN 0018–8689.

Ya–Quin Zhang et al: "Predictive Block–Matching Motion Estimation Scemes For Video Compression. Part II Inter–Frame Prediction of Motion Vectors" Williamsburg, Apr. 7–10, 1991, New York, IEEE, US, vol.–, 1991, pp. 1093–1095, XP000287099 ISBN, 0–7803–0033–5, PARA. 0002.

Kim D W et al. "Block Motion Estimation Based on Spatio–Temporal Correlation", Perth, Nov. 26–29, 1996 New York, NY: IEEE, US, Nov. 26, 1996, pp. 955–960, XP000782629 ISBN: 0–7803–3680–1, PARA. '0004.

Nicolas H et al: "Region–Based Motion Estimation Using Deterministic Relaxation Schemes For Image Sequence Coding" Proceedings of the International Conference on Acoustics, Speech and Signal Processing (ICASSP), US, New York, IEEE, vol. Conf. 17, Mar. 23, 1992 pp. 265–268, XP000378924, ISBN 0–7803–0532–9, PARA. '0002.

* cited by examiner

*Primary Examiner*—Howard Britton
(74) *Attorney, Agent, or Firm*—Douglas S. Rupert; Wildman, Harrold, Allen & Dixon

(57) ABSTRACT

A motion factor coding apparatus receives an input video signal which is applied to a subtractor and to a motion estimator which generates motion vectors for the current frame relative to a reference frame that is stored in the motion estimator. The motion vectors are passed to a buffer which are then iteratively update in a re-estimator. The number of iterations can be set to a fixed number or can be controlled by measuring the effect of each successive update on the motion. When a satisfactory number of iterations is reached, update motion vectors are passed to a motion compensator which generates a predicted frame which is applied as another input to the subtractor where the predicted frame is subtracted from the current frame in the input digital video signal. The subtraction removes temporal redundancy in the signal.

21 Claims, 5 Drawing Sheets

ENCODING DIGITAL SIGNALS

The present invention relates to a method and apparatus for encoding digital signals. The invention is of particular advantage in the compression and transmission of digital video signals.

Digital video compression systems can reduce the data rate of the transmitted signal by using temporal predictive coding. In the coding process, predictions are made for the reconstruction of the current picture (or frame) based on elements of frames that have been coded in the past. These picture elements (or blocks) can be manipulated in a certain way before they form the basis of the prediction. Prediction parameters (or motion vectors) relate the predicted blocks to earlier blocks. The motion vectors used in the manipulation of the blocks have to be transmitted to the receiver with a residual signal. This minimises the effects of prediction errors and makes it possible to reconstruct the sequence at the receiver.

Due to the spatial correlation of adjacent picture elements, the motion vectors themselves are coded differentially. This means that the differences between successive motion vectors are coded. Therefore small changes are represented by fewer bits of code than larger ones which are less common.

The quality of the block prediction is assessed using a distortion measurement which is based on the difference between the predicted block and the block to be coded.

A problem arises when predictions of approximately equal quality are made from completely different picture areas. There is a danger that a small advantage in prediction quality may be outweighed by a larger code word representing the motion vector. This situation is particularly common when picture areas are corrupted by noise and the motion vectors vary radically from one prediction to the next.

Accordingly, one object of the present invention is to provide a method and apparatus for improving the selection of motion vectors by using additional information in the motion estimator.

According to one aspect of the present invention, there is provided a method of generating prediction parameters for a digital coding technique, the method comprising the steps of: estimating a plurality of initial prediction parameters, storing the initial prediction parameters and re-estimating the or each initial prediction parameter in dependence on one or more other said initial prediction parameters, characterised in that the method further comprises repeating the re-estimating step one or more times to generate the prediction parameters.

According to a second aspect of the present invention there is provided apparatus for generating prediction parameters for a digital coding technique, the apparatus comprising: an estimator for estimating a plurality of initial prediction parameters, a buffer for storing the initial prediction parameters, and a re-estimator for re-estimating the or each initial prediction parameter in dependence on one or more other said initial prediction parameters, characterised in that the re-estimating step is repeated one or more times to generate the prediction parameters.

An advantage of the present invention lies in the fact that a set of motion vectors can be iteratively improved by using neighbouring (spatial or temporal) motion vectors in the prediction process. This effectively means that the motion vectors in the top left corner of the frame are influenced by motion vectors in the bottom right hand corner, or by motion vectors in future and past frames. As a result, the motion vectors represent the true motion in the video sequence and can be coded using fewer bits.

Advantageously the present invention can be used in motion compensated noise reduction techniques which require a good estimate of the underlying video motion for optimum performance. The present invention provides an estimate of this motion by being robust to the noise corruption which in the prior art causes neighbouring motion vectors to be radically different. Radically different motion vectors need a higher bandwidth for transmission.

Reference will now be made, by way of example, to the accompanying drawings, in which.

Figure 1:
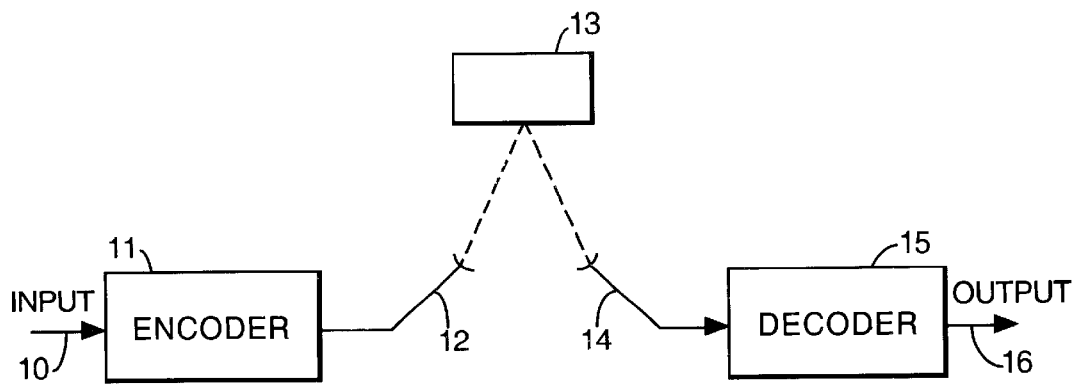
FIG. 1 is a simplified diagram of a broadcast system according to one aspect of the present invention.

A broadcast system is illustrated in FIG. 1 and includes an encoder 11 and a decoder 15. An input digital video signal is passed to the encoder 11, which produces a compressed output digital signal 12. The compressed output digital signal 12 requires less bandwidth for transmission. The compressed signal 12 is transmitted to a receiver 14 where it is passed to a decoder 15. The decoder 15 produces an uncompressed video signal 16. In FIG. 1, the transmission from the encoder 11 to the decoder 15 is via a satellite 13. Clearly other means of transmission could be used to replace satellite transmission.

Figure 2:
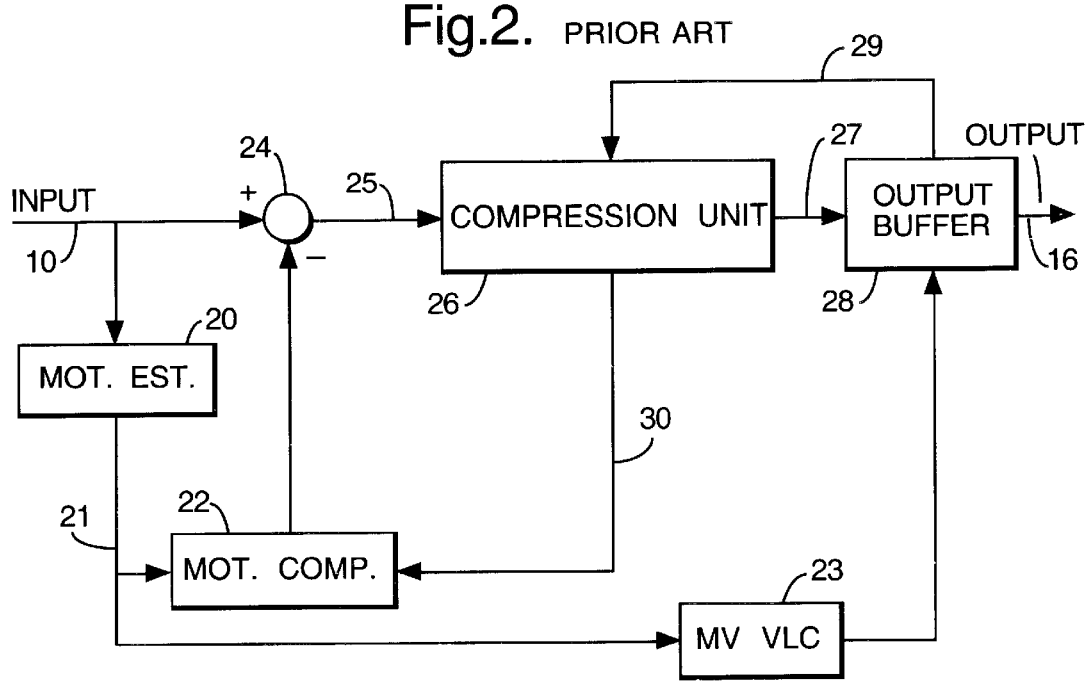
FIG. 2 is a block diagram of a digital video encoder in the FIG. 1 system.

FIG. 2 shows a simplified block diagram of a digital video encoder. A current frame (not shown in the diagram) in the video input signal 10 is passed to a motion estimator 20. The motion estimator 20 generates motion vectors 21 for the current frame relative to a previous frame (reference frame) that is stored in the motion estimator 20. The motion vector selection is explained in FIG. 4. These motion vectors 21 are passed to a motion compensator 22. The motion compensator 22 generates a predicted frame (not shown in the diagram) using the motion vectors 21 and a stored reference frame.

The predicted frame is passed from the motion compensator 22 to a subtractor 24 and subtracted from the current frame in the input digital video signal 10. This subtraction removes temporal redundancy in the signal. The resulting residual signal 25 is passed to a compression unit 26. The compression unit 26 removes spatial redundancy in the signal, reducing the required bandwidth still further. The compressed output signal 27 from the compression unit 26 is passed to the output buffer 28. The amount of compression applied in the compression unit 26 is controlled by a control signal 29. The control signal 29 varies the amount of compression to prevent the output buffer 28 from overflowing or underflowing.

A decompressed signal 30 from the compression unit 26 is passed to the motion compensator 22. This decompressed signal 30 is used to generate a reference frame in the motion compensator 22 for subsequent frames. The motion vectors 21 generated by the motion estimator 20 are also passed to a motion vector variable length coder 23 (MV VLC). The motion vector variable length coder 23 compresses the motion vectors 21 by assuming that adjacent motion vectors are similar. The coder 23 exploits this similarity by coding the difference between adjacent motion vectors. However, if neighbouring motion vectors are radically different, then this type of coding can prove to be highly inefficient. The coded output from the motion vector variable length coder 23 is passed to the output buffer 28 for onward transmission. It will be appreciated by those skilled in the art that motion vector estimation could also be performed using alternative embodiments.

Figure 3:
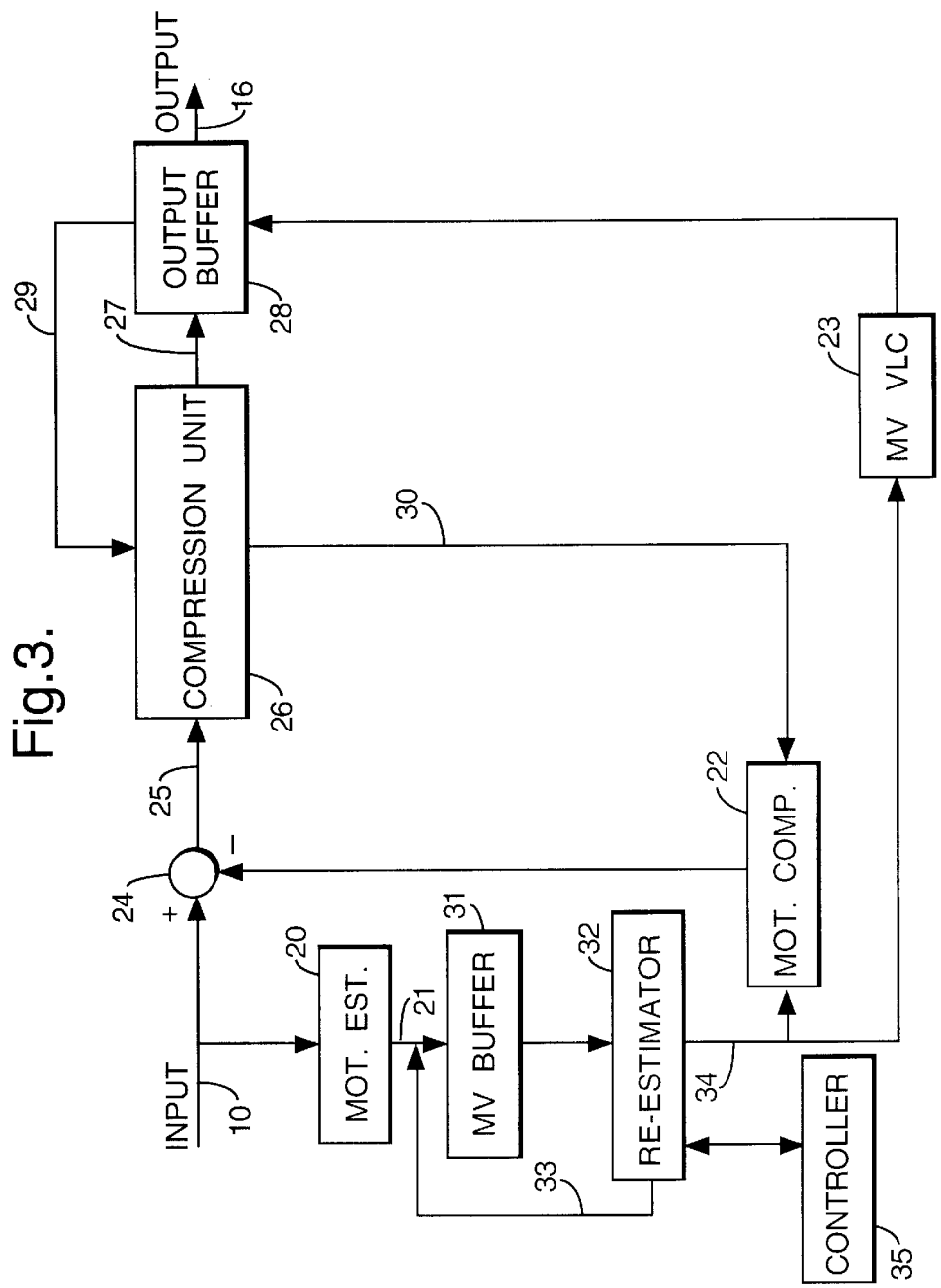
FIG. 3 is a block diagram of one embodiment of the present invention.

FIG. 3 shows one embodiment of the present invention. A current frame in the video input signal 10 is passed to a motion estimator 20 which again generates motion vectors 21 for the current frame relative to a reference frame. The motion vectors 21 are not passed directly to a motion compensator 22 or to a motion vector variable length coder 23. Instead the motion vectors 21 for the current frame are stored in a motion vector buffer 31. The motion vectors in the buffer 31 are iteratively updated in a re-estimator 32 as described with reference to FIG. 6. The updated motion vectors 33 are stored again in the motion vector buffer 31 for use in subsequent updates. The number of iterations can be set to a fixed number in a controller 35 or can be controlled by measuring the effect of each successive update on the motion. Only then will the controller 35 indicate that the updated motion vectors 34 are to be passed to the motion compensator 22 and to the motion vector variable length coder 23. The functionality of the remaining blocks in the video encoder are as described with reference to FIG. 2.

Figure 4:
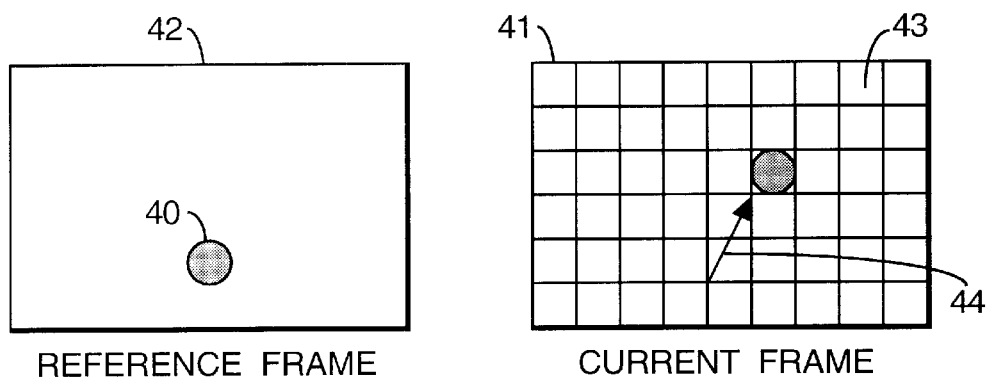
FIG. 4 is an explanatory diagram to illustrate how motion vectors make use of temporal redundancy in a digital video sequence.

FIG. 4 introduces the concept of using motion estimation to improve the compression of a video signal. Consider the simple case of a video sequence showing a moving ball 40. FIG. 4 shows two adjacent frames 41, 42 of the video sequence. Temporal redundancy can be removed by predicting the current frame 41 from the reference frame 42 using motion vectors. In order to estimate the motion vectors for the current frame 41, it is first partitioned into smaller blocks 43 (current blocks). The motion estimator searches for the closest match (reference block) in the reference frame 42 for each of the current blocks 43. In ISO/IEC 13818 (MPEG-2), the search can either be performed in the previous reconstructed frame (P frames) or in future reconstructed frames (B frames) or a combination of the two. Having located the closest match for each block in the current frame, the current blocks 43 are then assigned motion vector 44 indicating where the reference blocks are located, as demonstrated for one such block in FIG. 4.

Any errors between the current and reference blocks are coded as a residual error signal and transmitted with the motion vectors to allow correct reconstruction. Rather than coding and transmitting each frame independently, better data compression can be achieved by coding and transmitting the frames as a set of motion vectors and a residual frame error signal.

The matching reference block can be identified using the sum of absolute differences (SAD) or mean square error (MSE) criteria. For example the SAD is typically defined as:

$$SAD(d_n) = \sum_{m \in B_n} |f_m - p_{m-d_n}|$$

where n is the block index. $f_m$ is the pixel value at location m in block $B_n$. $P_{m-dn}$ is the pixel value from the reference frame at location m in block $B_n$ offset by the motion vector $d_n$. The absolute difference of $f_m$ and $p_{m-d_n}$ is calculated and summed over all the pixels in the block to provide a measure of distortion between the current block and the reference block. The SAD is calculated for all blocks in the search area, and the block with the lowest SAD is used as the reference block for reconstruction. The location of the reference block in relation to the current block is recorded as a motion vector.

The set of motion vectors for each frame is coded differentially, from one motion vector to the next. This improves compression still further, due to the assumption that neighbouring current blocks will have motion vectors to neighbouring reference blocks. Unfortunately, in the presence of noise this is not always the case and neighbouring current blocks can have radically different motion vectors, even though the true underlying motion for that portion of the picture is constant from one block to the next.

Figure 5:
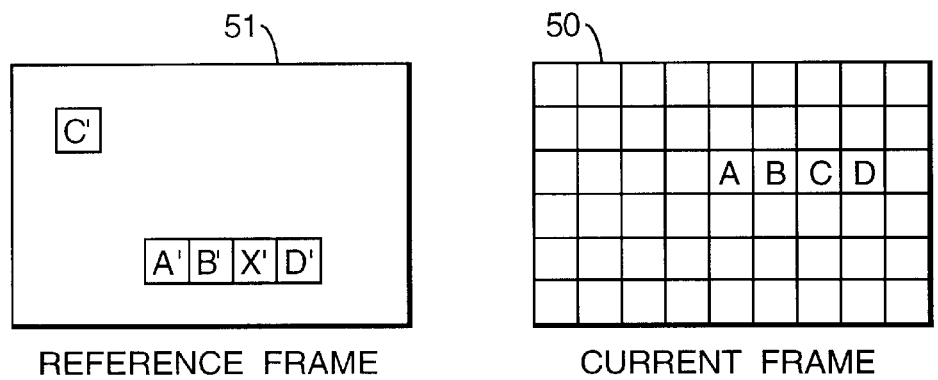
FIG. 5 is an explanatory diagram showing the problems associated with selecting motion vectors using a minimum distortion criterion.

FIG. 5 illustrates this problem. There is shown a series of neighbouring blocks A, B, C and D in the current frame 50. Blocks A, B, C and D are predicted from blocks A', B', C' and D' respectively in a reference frame 51. However, it can be seen that reference block C' is spatially separate from the other reference blocks and block X' would initially appear to be the better choice. Reference block C' is selected as it matches block C slightly better than block X'. However the small coding advantage that this would afford is outweighed by the larger codeword required to represent the dramatic change in the associated motion vector. This example is illustrative of how the selection of motion vectors based purely on the closest match may give less than the optimum performance.

Figure 6A:
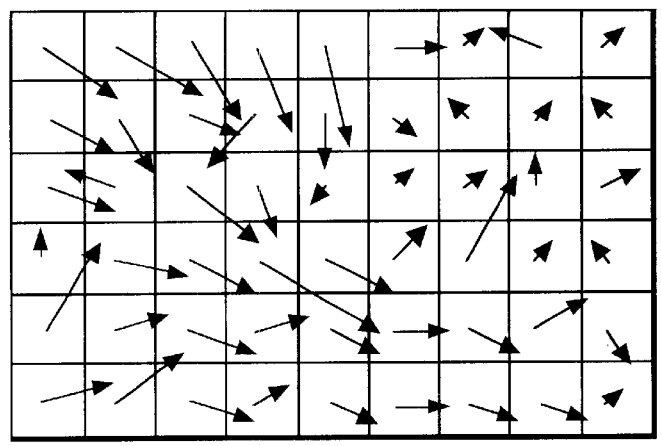
FIG. 6 is an explanatory diagram showing one effect of the present invention on motion vector estimation.

These problems can be overcome using the inventive method described in FIG. 6. The motion vectors are represented by a series of arrows on the picture, showing the magnitude and direction of the motion. In an initial pass, the motion vectors are calculated as previously described using SAD or MSE as the block matching criterion. This may produce a set of motion vectors as illustrated in FIG. 6(a). These motion vectors form the basis for the regularisation cycle, where each motion vector is biased towards the motion vectors for the surrounding blocks. By performing this additional cycle, the motion vector choice is now influenced by the surrounding motion vectors. This improves on the previous method by reducing the chance of selecting a motion vector that is in a radically different location over an adjacent motion vector of slightly inferior SAD. The motion vector choice is also biased towards motion vectors of zero length. This ensures start-up and recovery in situations where there are several blocks of exactly equal quality in the search area, e.g. in the case of monochromatic areas.

These biased selections can be implemented through the use of an error function of the form:

$$err(d_n) = SAD(d_n) + \alpha \|d_n\| + \sum_{m \in D_n} \beta((1 - l_{n,m})\|d_n - d_m\| + l_{n,m}\delta)$$

where $\alpha$ and $\beta$ are biasing constants, $\|d_n\|$ is the length of the current motion vector, $\|d_n - d_m\|$ is the absolute difference between the current and neighbouring motion vectors. $D_n$ is the set of motion vectors for neighbouring blocks and $l_{n,m} \in \{1,0\}$, describes the connection between the motion vectors $d_n$ and $d_m$. When $l_{n,m}=1$, an edge is assumed to lie between the two vectors and vice versa. The threshold at which an edge is inserted is controlled using the parameter $\delta$. When $\|d_n - d_m\| > \delta$ it is better to insert an edge and vice-versa. It should be appreciated by someone skilled in the art, that other biasing measures could be used in the error function to obtain similar advantages.

In summary; the term SAD($d_n$) biases the selection towards the closest match, the term $\|d_n\|$ biases the selection towards small motion vectors and the term $\|d_n-d_m\|$ biases the selection towards neighbouring motion vectors which encourages smoothness, except across boundaries where $l_{n,m}=1$. It is also possible to achieve an acceptable performance without this boundary breaking. Performance can also be improved by initialising the vector estimates to the results from the previous frame.

Figure 6B:
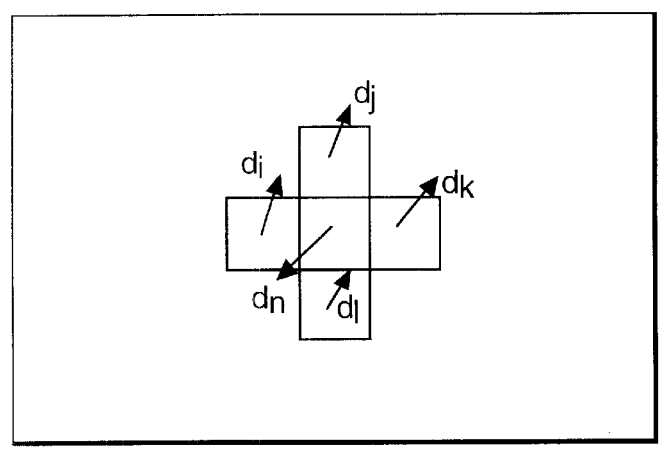
Figure 6C:
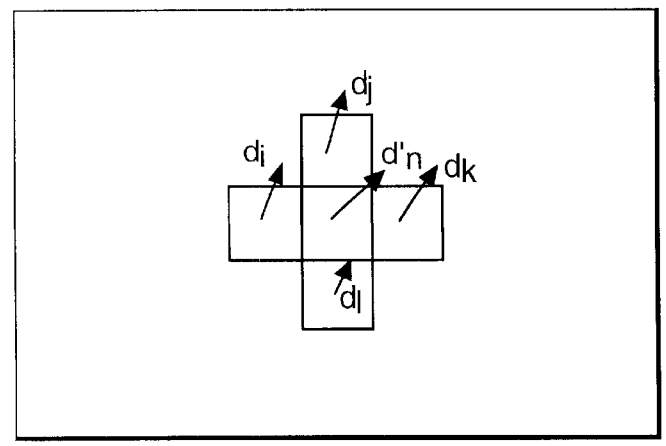

This update cycle can be further explained with the help of FIG. 6(b), which represents a subsection of FIG. 6(a). The motion vector estimate, $d_n$ can be improved by regularisation. The spatially surrounding motion vectors, $d_i,d_j,d_k,d_l$ are chosen as the neighbouring motion vectors, although it would be equally as valid to chose other motion vectors, including those that are temporally adjacent. The motion vector $d_n$ is updated to that shown in FIG. 6(c) using the error function described earlier. $d_n$ has been modified to include the neighbouring motion vector estimates and as such, the regularisation step has produced a smoother set of motion vectors. This regularisation step is repeated for the entire update cycle. Note that the updated motion vector $d_n$ is subsequently used as a neighbouring motion vector for $d_k$, for example. This update cycle can be repeated to iteratively improve the motion vector estimates over the entire frame. The number of iterations can be set to a fixed number or can be controlled by measuring the effect of each successive update on the motion, as described with reference to FIG. 3.

Figure 7A:
FIG. 7 is a diagram showing a comparison of the present invention with the prior art.
Figure 7B:

The advantage of using this iterative method is demonstrated in FIG. 7. A frame in a video sequence entitled "Renata with Scarf" illustrates the difference between using a minimum distortion criterion in FIG. 7(a) and using the iterative method in FIG. 7(b). The motion vectors are represented by a series of lines on the picture, showing the magnitude and direction of the motion. As demonstrated to the right of the calendar in FIG. 7(a), the motion vectors are pointing in various directions and there appears to be no order to the motion. This is caused by the motion estimator selecting the block with the minimum SAD, regardless if it is representative of true motion in the video sequence. However the motion vectors in FIG. 7(b) are iteratively updated to produce an improved set of motion vectors. It can be seen that regularising the motion vector field produces a smoother overall result which represents the true underlying motion of objects in the video sequence, thus improving the coding efficiency.

This invention is of use in the estimation of motion vectors for improving digital video compression. In particular, with reference to FIG. 3, the set of motion vectors 34 can be compressed more efficiently in the motion vector variable length coder 23. The compressed signal from the motion vector variable length coder 23 is passed to the buffer 28 for onward transmission. This means that the output signal 16 can be transmitted to the receiver using less bandwidth.

This iterative method is also directly applicable to hierarchical motion search strategies where the motion vectors are iteratively refined at each stage of the search. Other potential applications for this iterative approach include motion compensated noise reduction where it is necessary to correctly detect the true underlying motion of the picture.

What is claimed is:

1. A method of generating motion vectors of an applied video signal having video frames including the steps of:
   applying said signal to a subtractor and to a motion estimator;
   generating initial motion vectors in said motion estimator for a current frame relative to a reference frame;
   storing said initial motion vectors in store means;
   iteratively updating said initial motion vectors in said store means;
   controlling a number of said iterations in dependence upon one of a predetermined number of iterations and measuring an effect of each successive update on the motion until a desired result is achieved;
   applying update motion vectors to a motion compensator for generating a predetermined frame; and
   applying said predetermined frame to said subtractor where said predicted frame is subtracted from said current frame.

2. The method of claim 1, further comprising estimating the initial motion vectors using a measure of distortion.

3. The method of claim 1, further comprising re-estimating the initial motion vectors with reference to adjacent initial motion vectors.

4. The method of claim 3, further comprising detecting the presence of a discontinuity between adjacent initial motion vectors.

5. The method of claim 4, further comprising disregarding the effect of the adjacent initial motion vector on detection of the discontinuity.

6. The method of claim 1, further comprising biasing the initial motion vector towards small displacements.

7. The method of claim 1, further comprising estimating the initial motion vectors for a block of pixels.

8. Apparatus for generating motion vectors of an applied video signal having frames including:
   a subtractor having first and second inputs, and a motion estimator, each of said first input of said subtractor and said motion estimator being arranged to be applied with said video signal, said motion estimator generating initial motion vectors for a current frame relative to a reference frame;
   store means for storing said initial motion vectors;
   means for iteratively updating said initial motion vectors in said store means;
   control means for controlling a number of said iterations in dependence upon one of a predetermined number of iterations and measuring an effect of each successive update on the motion until a desired result is achieved;
   motion compensator means arranged to receive updated motion vectors so as to generate a predicted frame; and
   means for applying output from said motion compensator means to said second input of said subtractor where said predicted frame is subtracted from said current frame applied to said subtractor first input.

9. The apparatus of claim 8, wherein the initial motion vectors are estimated using a measure of distortion.

10. The apparatus of claim 8, wherein the initial motion vectors are re-estimated with reference to adjacent initial motion vectors.

11. The apparatus of claim 10, wherein the presence of a discontinuity between adjacent initial motion vectors is detected.

12. The apparatus of claim 11, wherein the effect of the adjacent initial motion vectors is disregarded on detection of the discontinuity.

13. The apparatus of claim 8, wherein the initial motion vectors are biased towards small displacements.

14. The apparatus of claim 8, wherein the initial motion vectors are estimated for a block of pixels.

15. A method of generating prediction parameters for a digital coding technique, the method comprising the steps of:

estimating a plurality of initial prediction parameters using a measure of distortion;

storing the initial prediction parameters; and re-estimating the or each initial prediction parameter in dependence upon a discontinuity between adjacent initial prediction parameters and repeating the re-estimating step one or more times to generate the prediction parameters.

16. The method of claim 15, further comprising disregarding to the effect of the adjacent initial prediction parameter on detection of a discontinuity.

17. The method of claim 15, further comprising biasing the initial prediction parameters towards small displacements.

18. The method of claim 15, further comprising providing the input digital signal as an input digital video signal.

19. The method of claim 18, further comprising providing the prediction parameters as motion vectors associated with the digital video signal.

20. The method of claim 19, further comprising estimating the motion vectors for a block of pixels.

21. Apparatus for generating prediction parameters for a digital coding technique, the apparatus comprising:

an estimator for estimating a plurality of initial prediction parameters;

a buffer for storing the initial prediction parameters;

a re-estimator for re-estimating the or each initial prediction parameter with reference to the presence of a discontinuity between adjacent initial prediction parameters, wherein said re-estimator is arranged to perform the re-estimation one or more times to generate the prediction parameters.

* * * * *